US007055005B2

United States Patent
Walker et al.

(10) Patent No.: US 7,055,005 B2
(45) Date of Patent: May 30, 2006

(54) METHODS AND APPARATUS USED TO RETRIEVE DATA FROM MEMORY INTO A RAM CONTROLLER BEFORE SUCH DATA IS REQUESTED

(75) Inventors: William J. Walker, Houston, TX (US); Andy Olsen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 438 days.

(21) Appl. No.: 10/408,796

(22) Filed: Apr. 7, 2003

(65) Prior Publication Data

US 2004/0199728 A1   Oct. 7, 2004

(51) Int. Cl.
*G06F 12/00* (2006.01)
(52) U.S. Cl. .................... 711/137; 711/138; 711/118
(58) Field of Classification Search .............. None
See application file for complete search history.

(56) References Cited

U.S. PATENT DOCUMENTS

| | | | |
|---|---|---|---|
| 5,499,355 A * | 3/1996 | Krishnamohan et al. .... | 711/137 |
| 5,530,941 A * | 6/1996 | Weisser et al. ............ | 711/151 |
| 5,537,573 A * | 7/1996 | Ware et al. ................ | 711/137 |
| 5,664,147 A * | 9/1997 | Mayfield .................... | 711/137 |
| 5,802,323 A | 9/1998 | Bujanos et al. | |
| 5,813,036 A | 9/1998 | Ghosh et al. | |
| 5,835,741 A | 11/1998 | Elkhoury et al. | |
| 5,964,859 A * | 10/1999 | Steinbach et al. .......... | 710/310 |
| 6,092,141 A | 7/2000 | Lange | |
| 6,115,796 A * | 9/2000 | Hayek et al. ............... | 711/146 |
| 6,199,131 B1 | 3/2001 | Melo et al. | |
| 6,301,630 B1 | 10/2001 | Chen et al. | |
| 6,301,632 B1 | 10/2001 | Jaramillo | |
| 6,314,472 B1 | 11/2001 | Trieu et al. | |
| 6,502,157 B1 | 12/2002 | Batchelor et al. | |
| 6,581,129 B1 | 6/2003 | Buckland et al. | |
| 6,631,437 B1 | 10/2003 | Callison et al. | |
| 6,754,779 B1 * | 6/2004 | Magro ........................ | 711/137 |
| 2003/0217231 A1 * | 11/2003 | Seidl et al. ................ | 711/137 |
| 2004/0054841 A1 | 3/2004 | Callison et al. | |

OTHER PUBLICATIONS

Tom Shanely et al., "PCI System Architecture," 1995, MindShare, Inc., 3rd Edition, p. 131.

* cited by examiner

*Primary Examiner*—Mano Padmanabhan
*Assistant Examiner*—Craig E Walter

(57) ABSTRACT

A memory controller retrieves data from memory before such data has actually been requested by an electrical device. The RAM controller may store such data into a prefetch buffer.

24 Claims, 2 Drawing Sheets

METHODS AND APPARATUS USED TO RETRIEVE DATA FROM MEMORY INTO A RAM CONTROLLER BEFORE SUCH DATA IS REQUESTED

CROSS-REFERENCE TO RELATED APPLICATIONS

This application is related to co-pending application Ser. No. 10/408,801, entitled "Methods And Apparatus Used To Retrieve Data From Memory Before Such Data Is Requested," filed Apr. 7, 2003, and incorporated herein by reference.

BACKGROUND

1. Field of the Invention

The present invention generally relates to retrieving data from memory before the data has been requested by an electrical device.

2. Background Information

Conventional computer systems, and other types of electronic systems, have memory that generally is accessible by a variety of system components. Such system components may include microprocessors, network interface controllers, graphics subsystems, etc. To facilitate the efficient interaction with memory by such components, a typical system may include a memory controller. The memory controller may provide a mechanism through which various system components can issue read and/or write requests to memory. The memory controller includes arbitration logic to determine which request, of multiple pending memory requests, should next be granted access to memory. Numerous examples of memory controllers and arbitration logic are available. See e.g., U.S. Pat. Nos. 6,269,433, 6,226,755, and 6,233,661, all of which are incorporated herein by reference.

The transfer of a command or data message across a bus may require the coordination of various control signals to initiate the cycle, claim the cycle, and complete the cycle. Core logic, such as that included in microprocessors, typically operates at higher clock rates than the busses to which the devices connect. In general terms, a microprocessor receives and processes data or writes data at a much faster pace than the memory, and the busses interconnecting the microprocessor and memory, can function to transfer the data. As such, the operational bottleneck often is the transfer rate of data across the system's busses. Thus, improvements which expedite the transfer of data to or from memory may be desirable.

BRIEF SUMMARY OF EMBODIMENTS OF THE INVENTION

One or more of the problems noted above may be solved by a memory controller that retrieves a unit (e.g., a line of cache memory) before being requested by an electrical device. The memory controller may store such data in a prefetch buffer.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "prefetch" or "prefetched" is intended to refer to retrieving information from memory before the information is specifically requested by a device (e.g., processor) that will use the information. Prefetched data generally comprises data whose use can be anticipated, is retrieved from memory and is ready to be used before a request for the data is actually made.

DETAILED DESCRIPTION OF EMBODIMENTS OF THE INVENTION

The following discussion is directed to various embodiments of the invention. Although one or more of these embodiments may be preferred, the embodiments disclosed should not be interpreted or otherwise used as limiting the scope of the disclosure, including the claims, unless otherwise specified. In addition, one skilled in the art will understand that the following description has broad application, and the discussion of any embodiment is meant only to be exemplary, and not intended to intimate that the scope of the disclosure, including the claims, is limited to these embodiments.

Figure 1:
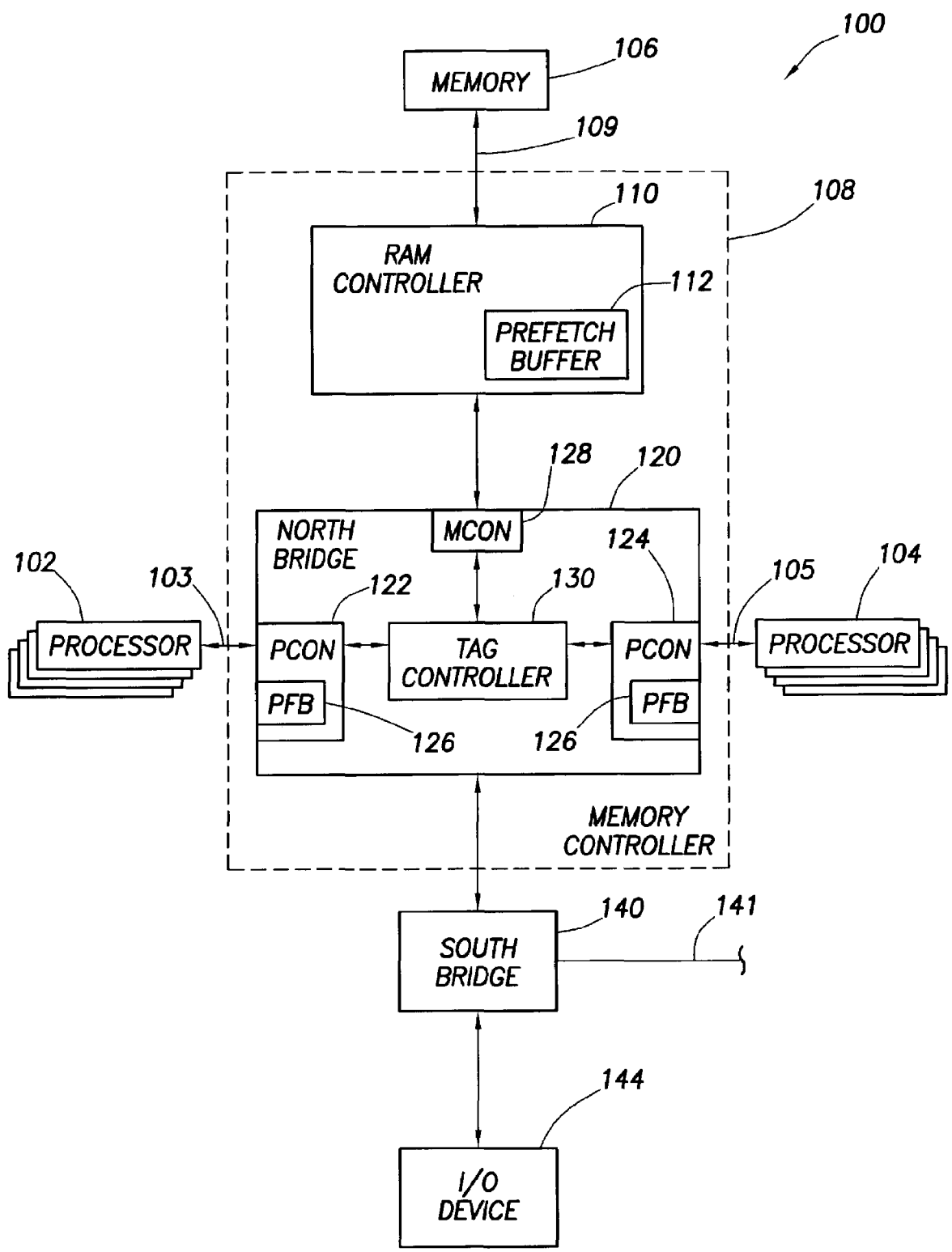
FIG. 1 shows a system diagram in accordance with embodiments of the invention in which prefetch buffers are used to store data fetched from memory in anticipation of the data needed by a system component.

Referring now to FIG. 1, a system 100 is shown in accordance with various embodiments of the invention. The system shown may be a computer system embodied in any form, such as a personal computer, server, desktop, laptop, handheld, etc. Alternatively, the system may be representative of equipment other than computers. As shown, the system includes processors 102 and 104, memory 106, a memory controller 108, a "south" bridge 140 and an input/output ("I/O") device 144. Other components may be included as desired.

In accordance with various embodiments, the memory controller 108 may couple to the processors 102, 104 and memory 106 as shown. Separate processor busses 103, 105 and memory bus 109 are used to couple the processors 102, 104 and memory 106 to the memory controller, although separate busses are not required. The memory controller 108 also may couple to the south bridge 140. The south bridge may provide multiple functions such as providing an interface to an external bus 141, which may comprise a peripheral component interconnect ("PCI") bus. The south bridge 140 also may function to interface the memory controller 108 with the I/O device 144. The I/O device 144 may comprise a keyboard, mouse, display, or any other input and/or output device.

The memory controller 108 shown in FIG. 1 may include separate interfaces to two separate groups of processors 102 and 104. Each processor bus 103, 105, over which the processors 102, 104 couple to the memory controller 108, may accommodate one or more processors (e.g., four processors on each processor bus 103, 105). Further, the system may be implemented with only a single processor bus coupled to one or more processors, or the system shown may be scaled to include more than two processor busses, if desired.

The memory 106 may comprise any suitable form of random access memory ("RAM"), including cache memory. For purposes of this disclosure, memory 106 is referred to as "main memory," "system memory," or "main system memory" indicating that the memory may be accessed in a single integrated component, either directly or indirectly, by a plurality of components in the system with the understanding that memory 106 may be cache memory. In accordance with some embodiments, the memory controller 108 may include a RAM controller 110 coupled to a "north" bridge 120. Alternatively, the functionality of the RAM controller 110 and north bridge 120 may be combined together. The RAM controller 110 generally receives read or write requests from the north bridge 120 and asserts various signals on the memory bus 109 to accomplish the desired read or write transaction.

The north bridge 120 may include processor interfaces 122 and 124 to processor busses 103 and 105, respectively, and a memory interface 128 to RAM controller 110. The interfaces 122, 124 and 128 couple, or are otherwise accessible by, a tag controller 130. The north bridge 120 may receive memory access requests from processor busses 103 and 105 and from the south bridge 140 and devices coupled to the south bridge such as devices (not shown) coupled to bus 141. As shown, the north bridge 120 also may include a tag controller 130.

When data is stored in cache memory, the data is maintained in two places—the cache memory and the memory from which the data was retrieved (such as the main DRAM memory array). When a subsequent request for that data is made, the request can be completed with respect to either copy of the data. The tag controller 130 in FIG. 1 may perform the function of determining whether a particular data that is targeted by a memory request is stored in cache. If the data, in fact, is already stored in cache memory, the request is completed from the cache memory. On the other hand, if the data is not present in cache memory, the request may be completed by accessing the original source of the data and a copy of the data may be written to cache memory for subsequent retrieval therefrom.

Referring still to FIG. 1, each processor 102, 104 may include cache memory (not specifically shown). One of the processors, or other system components, may issue a request to read a particular piece of data that currently resides in the cache memory of another processor. The tag controller 130 determines which, if any, of the processors 102, 104 contains the requested data in cache. If the data is already cached, the request is forwarded on to the processor containing the requested data and the requested data is read from that processor's cache.

For some processors, a read request to a memory address or a cache line may be followed up by a read request for a contiguous block of data or cacheline. As an example, if a processor issues a cacheline read request for 64 bytes of data from memory, several clocks later, the processor may issue another 64 byte read request to the address which, together with the previously read address, forms a 128-byte aligned read.

Given that a processor may subsequently request predictable data following an initial read request, in accordance with various embodiments of the invention, such data is prefetched in anticipation of the data subsequently being requested. One or more prefetch buffers may be included for this purpose. Referring still to FIG. 1, which illustrates one exemplary embodiment, but as explained previously not the only embodiment, a prefetch buffer 112 may be included in the RAM controller 112 and a prefetch buffer 126 may be included in each processor interface 122.

As such, when a processor 102 or 104 submits a read request for data at a particular memory location, the memory controller 108 retrieves the data at the target memory location and also retrieves data from another memory location in anticipation of such other data being needed. Such requested data may include entire cachelines. A minimum unit of data may be retrieved from memory. The minimum unit may be application-specific and may be a "line," a "block," or another defined unit of data. In general, the minimum unit of data may be larger than the data actually needed in a read request. The anticipatorily retrieved unit of data (including cachelines) is stored into the prefetch buffer 112 in the RAM controller 110. Once stored in prefetch buffer 112, the data then may be placed into the prefetch buffer 126 in the processor interface 122 or 124. Then, if the processor 102, 104 desires to read from memory that has already been prefetched, the memory controller 108 can supply the desired data to the requesting processor without having to run a read cycle to memory 106. Instead, the data may be provided from the prefetch buffer 112 or 126 to the processor requesting the data. By prefetching data into the memory controller 108, memory latency advantageously may be reduced.

The data that is prefetched from memory 106 may be pre-determined in accordance with a variety of techniques. For example, the prefetched data may be the data in memory 106 located in an adjacent memory location to the data requested from the read request. The adjacent memory location may be before or after the previously requested data. Also, the requested may be at some other memory location altogether. Generally, however, the prefetched data will be retrieved from a memory location that history has shown to be a likely target for read data following the initial read request. It should be understood that the initial read may be from a range of memory addresses and the prefetch cycle may be from another range of addresses.

In some embodiments such as discussed above, a processor 102 or 104 was described as requesting data and then requesting additional data that can be anticipated. It should be understood that the principles disclosed herein are not limited to processors reading data, but also apply to other types of devices as well. However, it may be desired to prefetch data based on read requests from some types of devices and not others. In accordance with some embodiments of the invention, read requests from processors 102, 104 may result in data being prefetched, but read requests from other types of devices may not result in data being prefetched.

Figure 2:
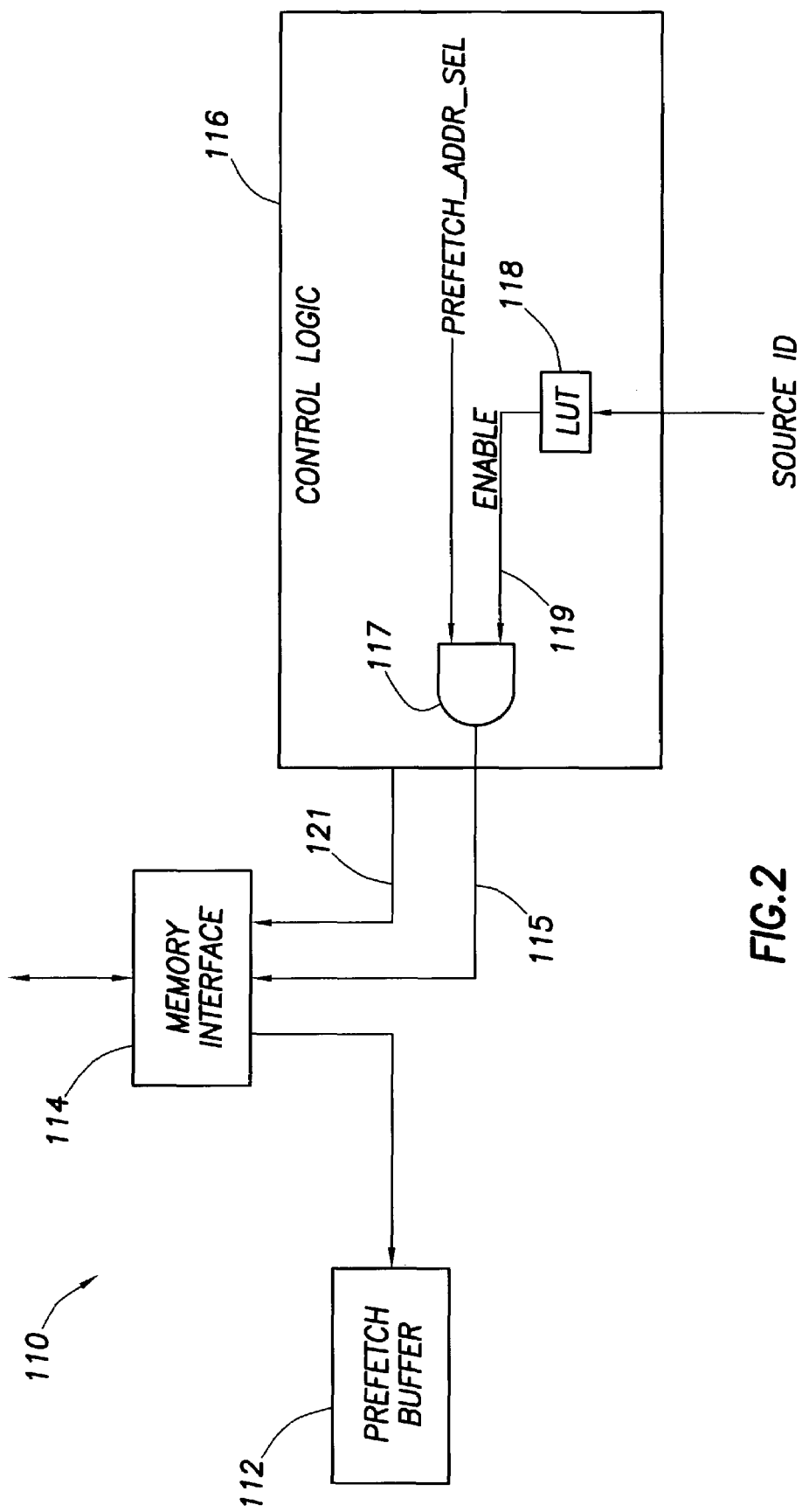
FIG. 2 shows a memory controller which determines when a processor is attempting to read data and only prefetch data based upon processor reads in accordance with embodiments of the invention.

FIG. 2 illustrates an embodiment of the invention for distinguishing the various types of devices that may issue memory read requests and prefetching data only for the predetermined types (e.g., processor reads). Referring to FIG. 2, some embodiments of the RAM controller 110 include the prefetch buffer 112, as described previously, a memory interface 114, and control logic 116. Other components may be included as well. The memory interface 114 couples to the prefetch buffer 112 and control logic 116 and also to memory 106 (FIG. 1). The control logic 116 may include a logic gate 117 and a look-up table 118.

In accordance with some embodiments, each memory request in the system may include, among other things, a value that identifies the source of the request. For purposes of this disclosure, this value is referred to as a "source identifier." The source identifier generally may be a value embedded in the memory request that uniquely identifies the processor 102, 104 or other electrical device that generated the request. The control logic 116 receives the decoded source identifier from a memory read request and, using the look-up table 118, may determine whether the associated request is one that should result in a prefetch operation. The look-up table 118 may identify those system devices for which read prefetches are desired. The look-up table 118 includes source identifiers, or one or more ranges of identifiers for which prefetch operations are to be performed. If a prefetch operation is to be performed for a particular source identifier, an enable signal 119 is asserted to indicate such a condition. Signal 119 preferably is provided to logic gate 117 (which may comprise an AND gate). A prefetch_addr_sel signal also is provided to logic 117. The prefetch_addr_sel signal indicates that the address encoded on signal 121 represents a memory address of a memory request. If the look-up table 118 indicates that the source of the read request is one for which data prefetching is desired, enable signal 119 is asserted so that the output signal 115 of the logic gate 117 is indicative of the prefetch_addr_sel signal. If, however, the look-up table 118 indicates that the source of the read request is one for which prefetching is not desired (e.g., the source is not a processor 102 or 104), the enable signal 119 is driven to a deasserted state thereby forcing the output signal 115 of the logic 117 to a state which indicates that address signal 121 does not represent an address to be prefetched or which indicates that address signal 121 should be ignored altogether.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   an electrical device;
   a cache memory coupled to said electrical device;
   bridge logic coupled to said electrical device; and
   a memory controller having a prefetch buffer, said memory controller coupled to said memory and to said bridge logic;
   wherein said electrical device issues a read request to said memory controller to retrieve a first cache line, said memory controller retrieves said first cache line and also retrieves a second cache line before the second cache line is requested by said electrical device and stores said second cache line in said prefetch buffer pending its request by said electrical device; and
   wherein said memory controller retrieves the second cache line before such second cache line is requested only if said electrical device is a predetermined type of device.

2. The computer system of claim 1, wherein the second cache line is retrieved from said cache memory at a memory location that is determined based on the first cache line.

3. The computer system of claim 2 wherein said second cache line is adjacent to said first cache line in said cache memory.

4. The computer system of claim 1, wherein said electrical device issues a read request for the second cache line and said memory controller responds by providing the previously retrieved second cache line from said prefetch buffer to the electrical device.

5. The computer system of claim 1 wherein said memory controller retrieves the second cache line before such second cache line is requested if a source identifier from said read request indicates that the electrical device is of the predetermined type.

6. The computer system of claim 1, wherein said memory controller retrieves said second cache line before such second cache line is requested only if said electrical device is a processor.

7. The computer system of claim 1 wherein said electrical device comprises a processor.

8. A memory controller through which an electrical device can access cache memory, comprising:
   a memory interface coupled to the cache memory; and
   an interface to bridge logic which couples to the electrical device; and
   a prefetch buffer coupled to the memory interface;
   wherein a read request is received from the electrical device via the bridge logic to retrieve a first cache line in the cache memory, said memory interface retrieves the first cache line and also retrieves a second cache line before such second cache line is requested by the electrical device and stores said second cache line in said prefetch buffer pending its request by said electrical device; and
   wherein said memory controller retrieves the second cache line before such second cache line is requested if a source identifier from said read request indicates that the electrical device is of the redetermined type.

9. The memory controller of claim 8 wherein the second cache line is retrieved from a location in the cache memory that is determined based on a location of the first cache line.

10. The memory controller of claim 9 wherein the second cache line location is adjacent to the first cache line location.

11. The cache controller of claim 8 wherein said memory controller receives a read request from the electrical device for the second cache line and said bridge logic responds by providing the previously retrieved second cache line from said prefetch buffer to the electrical device.

12. The memory controller of claim 8 wherein said memory controller retrieves the second cache line before such second cache line is requested if a source identifier from said read request indicates that the electrical device is of the predetermined type.

13. The memory controller of claim 8 wherein said memory controller retrieves said second cache line before such second cache line is requested only if said electrical device is a processor.

14. The memory controller of claim 8 wherein the electrical device comprises a processor.

15. A method of retrieving data from memory, comprising:
   (a) receiving a request for a first cache line;
   (b) retrieving the first cache line;
   (c) retrieving a second cache line before receiving a request for the second cache line; and (d) storing the second cache line in a buffer in a memory controller pending its subsequent request;

wherein (c) includes retrieving the second cache line only if an entity that submitted the request received in (a) is of a predetermined type.

16. The method of claim 15 further including receiving a request for the second cache line after which the second cache line stored in the buffer is retrieved.

17. The method of claim 15 further including determining the predetermined type by decoding a value in the request received in (a).

18. The method of claim 15 wherein (c) includes retrieving the second cache line only if an entity that submitted the request received in (a) comprises a processor.

19. An electronic system, comprising:
an electrical device;
a cache memory;
a memory controller coupled to said memory and said electrical device;
a means in the memory controller for receiving a request to retrieve a first cache line from said memory, for determining if the electrical device is of a predetermined type, for retrieving a second cache line before such second cache line is requested by said electrical device only if the electrical device is of the predetermined type, and for storing said second cache line pending its subsequent request.

20. A memory controller through which an electrical device can access memory, comprising:
a memory interface coupled to the memory;
an interface to bridge logic which couples to the electrical device; and
a prefetch buffer coupled to the memory interface;
wherein a read request is received from the electrical device via the bridge logic, said read request causing the memory controller to retrieve a first unit of data from the memory and the memory controller further retrieves a second unit of data from the memory before being requested and stores said second unit of data in said prefetch buffer, the first unit of data being a minimum amount of data retrievable by the read request; and
wherein the memory controller receives a read request from the electrical device for a data value contained in the second unit of data and retrieves the requested data value from the prefetch buffer.

21. The memory controller of claim 20 wherein said read request causes the memory interface to retrieve said first and second units of data.

22. The memory controller of claim 20, wherein the second unit is retrieved from a location in memory determined based on the first unit of data.

23. The memory controller of claim 20 wherein the second unit of data is retrieved only if the memory controller determines that the electrical device is of a predetermined type.

24. The memory controller of claim 23 wherein the predetermined type comprises a processor.

* * * * *

UNITED STATES PATENT AND TRADEMARK OFFICE
CERTIFICATE OF CORRECTION

| | | |
|---|---|---|
| PATENT NO. | : 7,055,005 B2 | Page 1 of 1 |
| APPLICATION NO. | : 10/408796 | |
| DATED | : May 30, 2006 | |
| INVENTOR(S) | : William J. Walker et al. | |

It is certified that error appears in the above-identified patent and that said Letters Patent is hereby corrected as shown below:

In column 6, line 1, in Claim 2, after "claim 1" delete ",".

In column 6, line 7, in Claim 4, after "claim 1" delete ",".

In column 6, line 17, in Claim 6, after "claim 1" delete ",".

In column 6, line 40, in Claim 8, delete "redetermined" and insert -- predetermined --, therefor.

In column 8, line 20, in Claim 22, after "claim 20" delete ",".

Signed and Sealed this

Tenth Day of March, 2009

JOHN DOLL
*Acting Director of the United States Patent and Trademark Office*